United States Patent
Masseroni et al.

(10) Patent No.: US 7,050,824 B2
(45) Date of Patent: May 23, 2006

(54) METHOD TO PERFORM DOWNLINK POWER CONTROL IN PACKET SWITCHING CELLULAR SYSTEMS WITH DYNAMIC ALLOCATION OF THE RF CHANNEL

(75) Inventors: Carlo Masseroni, Rho (IT); Sergio Parolari, Milan (IT)

(73) Assignee: Siemens Information and Communication Networks S.p.A., Milan (IT)

( * ) Notice: Subject to any disclaimer, the term of this patent is extended or adjusted under 35 U.S.C. 154(b) by 801 days.

(21) Appl. No.: 10/167,471

(22) Filed: Jun. 13, 2002

(65) Prior Publication Data

US 2003/0054850 A1 Mar. 20, 2003

(30) Foreign Application Priority Data

Jun. 28, 2001 (EP) .......................................... 01830436

(51) Int. Cl.
*H04B 7/00* (2006.01)

(52) U.S. Cl. ........................................ 455/522; 455/69

(58) Field of Classification Search ................ 455/522, 455/69, 513, 423, 67.11, 226.1, 115.1
See application file for complete search history.

(56) References Cited

U.S. PATENT DOCUMENTS

| | | | | |
|---|---|---|---|---|
| 6,781,973 B1 * | 8/2004 | Lee | ............................ | 370/332 |
| 6,829,226 B1 * | 12/2004 | Apostolides et al. | ....... | 370/318 |
| 6,831,910 B1 * | 12/2004 | Moon et al. | ................ | 370/342 |

* cited by examiner

*Primary Examiner*—Nick Corsaro
*Assistant Examiner*—Tu X Nguyen

(74) *Attorney, Agent, or Firm*—Birch, Stewart, Kolasch & Birch, LLP

(57) ABSTRACT

The invention discloses a method to perform downlink Power Control in packet switching cellular systems with dynamic allocation of the RF channel, such as GPRS/EGPRS. The performances concern a scenario in which a radio block transmitted from the Base Station (BTS) on a downlink channel has to be received from at least two MSs simultaneously, a first MS being the addressee of the data/control packet on the downlink TBF while the second MS being the addressee of the Uplink State Flag (USF) for scheduling transmission of the next data/control packet from an uplink TBF to an uplink shared channel. First MS transmits to the BTS a first measurement report including measures of BCCH level and interference level on all the timeslots, while the second MS transmits a NC report including measures of BCCH level only, that because detailed interference measure on the downlink channel are prevented due the absence of a concurrent downlink TBF. The measures are averaged in as many running average filters and the averages compared with target thresholds to find a first and a second power reduction intended for USF and packet transmission respectively. A final power reduction is selected from the two for the next PC execution step. Target threshold for the first MS's averaged measures is a C/I value which provides maximum achievable net throughput independently of Coding Scheme. Target threshold for the second MS depends on CS of the USF flag in a way that when the mean value of the level measures is equal to the threshold a fixed probability takes place that the USF flag is decoded with success. The network, in the capacity of the BSC and PCU, counts successfully and unsuccessfully blocks received upon transmission of the scheduled USFs for that uplink TBF, being the lack of a scheduled block noticed by the network. If successfully counting reaches a fixed maximum counting before, then an increment of the first power reduction is decided, while in case the maximum unsuccessfully counting is reached before a decrement of the first power reduction is instead decided (FIG. 10).

14 Claims, 9 Drawing Sheets

GSM (DCS) - GPRS (Enhanced) SYSTEM

TRAFFIC CHANNEL ORGANIZATION

Bi-directional full-rate TCH (T) GSM multiframe and associated signalling (A)

26 TDMA frames = 120 ms

GPRS multiframe including 12 Radio blocks (B)
of 4 basic frames each plus 4 idle frames (X)

52 TDMA frame = 240 ms

MAPPING RLC LAYER INTO PHYSICAL LAYER

GPRS Downlink RLC data block with MAC header

Downlink RLC/MAC control block with MAC header

Maximum achievable throughput

METHOD TO PERFORM DOWNLINK POWER CONTROL IN PACKET SWITCHING CELLULAR SYSTEMS WITH DYNAMIC ALLOCATION OF THE RF CHANNEL

FIELD OF THE INVENTION

The present invention relates to the field of radiomobile communication systems and more precisely to a method to perform downlink Power Control in packet switching cellular systems with dynamic allocation of the RF channel.

BACKGROUND ART

The known GSM-GPRS/EGPRS cellular system appears as the most relevant prior art on the field of the present invention, so before the disclosure of the invention the following panoramic on the system is given, taking advantage from the large GSM specifications coming from ETSI (European Telecommunications Standards Institute). Details on the constitution of the apparatuses and on the power control procedure will be given in the non-limiting embodiment.

The so-called General Packet Radio Service (GPRS) has been added to the Global System for Mobile communications (GSM) in order to achieve higher performance with data handling. This object is met by the introduction of a packet switching feature which doesn't request fixed connections for all the duration of an active session. Additional GPRS useful features for improving data handling are the capability to perform dynamic channel allocation to several users and the multislot assignment. The same packet data services also exist in Digital Cellular System (DCS) 1800 MHz.

The GSM-GPRS system bears three classes of operation for mobile stations: a class A mobile operates with GSM and GPRS simultaneously; a class B mobile watches GSM and GPRS control channels but can operate only a set of service at a time; finally a class C mobile only uses GPRS services. Furthermore physical resources at the Um interface can be shared between speech and packet data services on the basis of the traffic cell planning.

The GPRS service bears Quality of Service (QoS), see GSM 03.60, to assure among other things the following requirements: respect of a negotiated priority of service, service reliability, guarantee of a fixed end-to-end packet transfer delay, guarantee of medium and peak throughput in conformity with a certain multislot class. QoS parameters together with A, B, and C classes of operation and class of multislot capability take part in a User Profile made known to the network during GPRS attach.

GPRS exploits the same GMSK modulation (Gaussian Minimum Shift Keying, detailed in GSM 05.04) as GSM system and four convolutional Coding Schemes CS1 to CS4 to differently protect transmission bursts against transmission errors. An Enhanced GPRS (EGPRS) version made possible increased data-rates thanks to a higher modulation level, namely 8-PSK (Phase Shift Keying), in combination with additional five coding schemes. GMSK modulation is a non-linear Continuous Phase Modulation (CPM) characterized by compact spectrum and constant modulation envelope. The last feature also belongs to the EGPRS higher level modulation 8-PSK (Phase Shift Keying). Compact GMSK spectrum generates poor interferences into adjacent frequency channels by introducing a slight worsening of the intersymbolic interference. Constant modulation envelope allows the gain saturation of the power amplifier (class C amplifying) and consequent energy saving from the power supply. Besides, as far as concerns the present invention, downlink power control becomes easier to handle.

FIG. 1 of the description is similar to the FIG. 2 of standard ETSI GSM 03.60—"Service description". The system of FIG. 1 represents a cellular GSM(DCS) and GPRS(Enhanced) network including mobile stations communicating via radio with a fixed remaining part. In FIG. 1 a first type of Mobile Stations MS is suitable for voice communication (and short messages), while second type named User Equipment UE, each comprised of a Terminal Equipment TE for handling data (i.e. a PC) connected to a Mobile Terminating equipment MT, is suitable for data packet transmission. Mobile stations MS and UE camped on a cell are connected, via standard on air interface Um, to a fixed Base Transceiver Station BTS which serves either a central or trisectorial cell belongs to a clustered geographical area covered by the GSM-GPRS Public Land Mobile Network PLMN. The amplification gain of each BTS transmitter shall be individually regulated to meet a power level of the transmitted signal in accordance with the objective of the invention that will be disclosed.

In the remaining part of FIG. 1 more base stations BTS are connected to a Base Station Controller BSC through a not fully standardized Abis interface. The BSC controller includes a block PCU (Packet Control Unit) specialized in packet handling. The BSC controller, among its various tasks, weighs up the conditions to perform uplink power control (detailed in GSM 05.08) and downlink power control adopting the criterion of the invention in so far as it concerns GPRS/EGPRS. The BSC controller and its interconnected base stations BTSs constitute a Base Station Subsystem BSS serving a cluster of cells. An BSC controller in its turn is connected to a Message Switching Centre MSC and to a Service GPRS Support Node SGSN via the standard interfaces A and Gb respectively, both supporting SS7 signalling. The MSC centre and SGSN node are connected to a Home Location Register HLR and a Visitor Location Register VLR which add intelligence to the network by allowing mobility of communications. The MSC centre and SGSN node support Short Message Service SMS, being for this purpose connected to a Short Message Service Centre SM-SC via the functions SMS-GMSC (Short Message Service—Gateway MSC) and SMS-IWMSC (SMS—InterWorking MSC). The SGSN node is further connected to: 1) another SGSN node of the same PLMN network through a standard Gn interface; 2) a Gateway GSN node GGSN belonging to another PLMN network through a standard Gp interface; 3) a Gateway GSN node GGSN belonging to the same PLMN network, through the Gn interface, and the GGSN node is connected to either an IP (Internet Protocol) network or a X.25 Public Data Network PDN both specialized in packet data routing; 4) finally to an Equipment Identity Register EIR. The MSC centre is connected to the Public Switching Telephone Network PSTN also comprised of an Integrated Services Digital Network ISDN. Other than the mentioned interfaces, also the following standard ones are provided: Gf, Gs, Gr, Gd, D, E, C whose connections are visible in FIG. 1.

The schematized GSM-GPRS system is capable to switch both the traditional voice/data circuits and the new packed data. The SGSN node has the same role for packet data as the MSC centre has for voice circuits, it traces individual locations of the mobile stations enabled for data packet communication and performs security and access control functions. For this purpose the HLR register includes information concerning GPRS users. The GGSN node provides interworking with external data packet switching networks, in particular with a backbone network based on IP protocol.

Both GSM and GPRS use standard procedures at the relevant interfaces, namely for: synchronization, cell selection and reselection, paging, access control, requesting a dedicated channel, security, error detection and correction, retransmission of errored blocks under type I or type II ARQ (Automatic Repeating reQuest), uplink and/or downlink power control, voice and data flux control, routing, handover, billing, etc. Such procedures belong to a most general protocol having a layered structure named "Transmission Plane" proposed by the International Organization for Standardization (ISO) for Open System Interconnection (OSI). Based on ISO model an OSI system can be described by means of a set of subsystems fit in a protocol stack. A subsystem N which consists of one or more entities of level N interacts only with subsystems immediately upon and below it and a level N entity operates into its own level N. Peer level N entities communicate each other by using services from the underlying layer N. Similarly, layer N services are provided to the layer N+1 at an N-Service Access Point named N-SAP. Information transferred from a starting to an arrival point is always conveyed by physical channels provided at the crossed interfaces. Relevant layers for the arguments developed in this disclosure are the following:

Radio Link Control/Medium Access Control (RLC/MAC). The RLC layer-2 function provides a radio link with reliability and maps into GSM physical channels the Link Layer Control (LLC) layer-3 frames. The MAC function is provided to control and signalling procedures for accessing radio channel, i.e. request and grant. RLC/MAC protocol is standardized in GSM 04.60.

GSM RF is pertaining to the physical radio channel at the Um interface as standardized in the series of specifications GSM 05.xx The physical channel relevant for GPRS service is named PDCH (Packet Data Channel).

At GPRS planning stage the compatibility with pre-existent GSM system and procedures has been deliberately maintained to enable GPRS of exploiting the same physical channels as GSM at the Um interface and consequently promoting an easy integration. Both for GSM and GPRS there are signalling channels and traffic channels, the first ones are either for broadcast common control or for dedicated control, the second ones are either for voice or packet data. The additional logical GPRS channels, although referred to packet data have names and functional characteristics which follow from the conventional GSM channels; examples of relevant GPRS channels are the following: PBCCH (Packet Broadcast Control Channel), PCCCH (Packet Common Control Channel), PACCH (Packet Associated Control Channel), e PDTCH (Packet Data Traffic Channel). A list of relevant channels is reported in the specification GSM 05.01 titled "Physical layer on the radio path".

The Extended GSM 900 system is required to operate in the following frequency bands:

880–915 MHz: mobile stations transmit uplink, base station receives;
925–960 MHz: base station transmits downlink, mobile stations receive; while DCS 1 800 system is required to operate in the following frequency bands:
1.710–1.785 MHz: mobile stations transmit uplink, base station receives;
1.805–1.880 MHz: base station transmits downlink, mobile stations receive.

Each of the above frequency band is also used in GPRS service and includes a plurality of modulated carriers spaced 200 kHz apart. Full-duplex communications take place by Frequency Division Duplexing (FDD) technique. A carrier among those in use in a cell is assigned for all the duration of a timeslot TS out of eight cyclically repeated to allow time division among the users. During the assigned timeslot either GMSK or 8-PSK modulation impresses the characteristics of the modulating burst onto the phase of a carrier to be transmitted at radiofrequency.

With reference to FIG. 2 it can be appreciate the sequential organization of 8 timeslots TS0, . . . , TS7 constituting a 4,615 ms basic frame used in Time Division Multiple Access (TDMA) GSM-GPRS system. Four different typologies of burst are provided corresponding to the possible contents of any timeslot. The sequential frames are organized within more hierarchical levels observed by all the carriers used in the system. All the carriers transmitted by a BTS have reciprocally synchronized frames. Starting in the figure from bottom to top each timeslot has 0,577 ms duration, corresponding to 156,25×3.69 µs bit duration, and carries an information burst containing 142 useful bits, 3+3 tail bits TB, and a guard time GP without information 8,25 bits long. The 3.69 µs bit duration corresponds to 270,83 kbit/s which is the system cipher rate. The burst can be of four different types, namely: Normal burst, Frequency Correction burst, Synchronization burst, and Access burst. For the purposes of disclosure the only Normal burst is depicted in FIG. 2 where it includes 2×58 useful bits, redundancy included, and 26 bits of a training sequence in midamble position. Training sequence is a known pattern used to dynamically synchronize the received burst and to estimate the impulse response of the radio channel for correctly demodulating the incoming signal. The nature of the 116 bits payload will be detailed later on, distinguishing between GSM and GPRS. Continuing towards the upper part of FIG. 2 it can be noticed that two different typologies of multiframes are foreseen, namely a signalling multiframe for carrying control channels and a traffic multiframe for carrying payloads and associated signalling. The signalling multiframe is 253,38 ms long and includes 51 basic TDMA frames. A GSM traffic multiframe is 120 ms long and includes 26 basic TDMA frames. A GPRS traffic multiframe is 240 ms long and includes 52 basic TDMA frames. The two type of multiframes concur to form a unique superframe 6,12 seconds long, consisting of 1326 basic TDMA frames, finally 2048 sequential superframes form one iperframe of 2.715.648 basic frames TDMA of 3 h 28 m 63 s 760 ms duration. A frame Number FN referred to the frame position in the iperframe is broadcasted within the cell.

FIGS. 3a and 3b show traffic channel organization in the TDMA multiframes for voice/data and packet data respectively. FIG. 3a concerns GSM payload where a multiframe of 26 basic frame includes: 24 traffic frames (T), 1 associated control frame (A), and 1 idle frame (–). A physical channel inside a multiframe is constituted by the combination of one frequency and one repetitive timeslot. A singular burst of FIG. 2 span several periods of the RF carrier modulated by the relevant data stream. A burst therefore represents the physical content of a timeslot.

FIG. 3b concerns GPRS payload where a multiframe of 52 basic frames includes 12 radio blocks B0, . . . B11 of 4 basic frames each, intercalated with an idle frame (X) every three radio blocks. A radio block is carried on a channel defined as above spanning over 4 TDMA frames, so as the mean transmission time of a RLC block is near 20 ms.

FIG. 4 is referred to the GPRS service and shows a mapping of sequential RLC layer blocks into physical layer.

Each RLC block includes a block header BH of variable length, an information field comprising data coming from the upper layer LLC, and a field Block Check Sequence BCS used for error detection. A single RLC block is mapped into 4 sequential frames of the TDMA multiframe. So until 8 users can be interleaved in the period of a radio block.

GSM's payload timeslots are allocated one to one the different users, both in uplink and downlink, while as far as concerns GPRS service a flexible allocation is available. More precisely: 1) GPRS's payload timeslots are independently allocated in uplink and/or downlink; simultaneous physical links in the two directions are not mandatory as in the pure GSM; 2) singular users can take advantage of multislot allocation; 3) each configured data packet physical channel PDCH (timeslot) can be advantageously shared among different users which access it on the basis of appropriate priority rules managed from the PCU (FIG. 1). The MAC layer of GPRS protocol has appropriate procedures for governing dynamic allocation of the resources for packet data transfer. These procedures are activated from relevant control messages provided at the various interfaces to set up or set down a connection. Temporary Block Flows (TBF) are connections set up on physical layer by the MAC procedures, they include memory buffers to accommodate the queues of RLC/MAC radio blocks. Each TBF connection allows unidirectional point-to-point transfer of user data and signalling between a mobile station and BSC, or vice versa. A TBF connection is held for the only transfer of all the RLC/MAC blocks of a LLC protocol session. The network assigns to each TBF connection a respective Temporary Flow Identity, named TFI identifier, by associating a field in the header of RLC/MAC blocks. A mobile station can have:

both a downlink and an uplink connection, in this case the mobile station shall assume that TFI identifier is unique for uplink and downlink concurrent TBFs;

either a downlink or an uplink connection solely.

The header of RLC/MAC blocks further includes fields to specify direction and type of a control message. In case of dynamic allocation of the resources and in presence of at least one uplink TBF connection, the header of each RLC/MAC block transmitted downlink includes an Uplink State Flag field (3 bits), named USF, written from the network to enable the uplink transmission of a successive radio block on the same timeslot carrying USF. The one out M mobile stations listening a radio block in the current timeslot which matches the listen USF, is the only one enabled to transmit the successive radio block inside a block period. Scheduling downlink is performed from the network directly by transmitting the selected TFI.

Outlined Technical Problem

The outlined USF mechanism causes some problems in the performance of downlink Power Control (PC). As known, downlink PC is a BSC-BTS procedure which step by step modifies, within some range, the RF transmission power relevant to a controlled channel. The entity of the power modification depends on preceding Power and Quality measures performed by the mobile station on the received signal, and periodically transmitted towards the BTS. Power control procedure remedies for path loss and shadow attenuations; besides it further reduces the overall interference of the system, improving spectral efficiency, by reducing the transmitted power to the only level compatible with the target quality or data-rate. The problem arises because the dynamic allocation of the data packets forces at least two mobile stations to both reliable receive the same data packet (RLC/MAC Radio Block) transmitted by the BTS. Of the two mobile stations, a first one receives the payload and a second one is that out of N which matches with the transmitted USF. The two mobile stations can be wherever allocated in the cell and most probably the respective radio channels will meet with different physical conditions, nonetheless both of them have to be served for the best from the BTS station. The network, to perform this task in the right way, has to known quality and attenuation on both downlink radio channels of the two mobile stations concerned; that implies the existence of at least the two downlink TBFs (the ideal condition being concurrent TBFs for each mobile station), but this is not always assured due to the reciprocal independence of uplink from downlink TBF assignment. In fact, depending on the actual operative context, the mobile station addressee of the USF should stand up without a downlink TBF as well and cannot inform the network consequently.

In conclusion, the outlined problem arises for mobile stations with an uplink TBF only. These mobiles, if not otherwise provided, don't transmit towards the network any information on the channel condition; differently from the mobile stations having either downlink or concurrent TBFs, which transmit uplink to the network information concerning the borne interference and the power level of the listened BCCH channel relevant to the serving cell. It's useful outline that for downlink power control the network decisions should be primarily based upon the received signal quality, namely the C/I ratio, rather than on the received signal level (C_VALUE, RXLEV). The reason behind this is that the transmitter power directly affects the quality of the radio link, so that the received signal may be dominated by cochannel interference.

Defects of the Prior Art

GPRS specifications indicate a power control procedure suitable for managing the outlined case of mobile stations without the downlink TBF. In such a case the network obtains information on the radio channel conditions by activating a standard procedure named "Network Control Reselection" in the operative mode which supplies the network with measures originated from the mobiles. The absence of a downlink TBF makes de facto impossible to that mobile station addressee of the USF the performance of a systematic measure of the interference level; so that the unique measure performed is the level ($R_{AVG\_SERVINGCELL}$) of the listened BCCH of the serving cell, always broadcasted at the maximum power level. Information about interference is not provided at all by this procedure. The network, based on the level measure ($R_{AVG\_SERVINGCELL}$) received uplink, calculates the maximum level ($R_{AVG\_PDTCH}$) which can be reached on an hypothetical downlink traffic channel PDTCH set up for the transmission towards the mobile station addressee of the USF flag. Then it establishes a threshold (T_LEV_USF) corresponding to the desired level on the hypothetical PDTCH channel at the mobile station side. From the difference between the calculated maximum reachable level ($R_{AVG\_PDTCH}$) and the threshold (T_LEV_USF) a correct power reduction is obtained, spanning from zero and an allowed upper limit (MAX_PR_TBF) of 10 dB.

The drawback of the outlined downlink GPRS power control procedure is the complete absence of any countermeasures against the intrinsic unreliability of the calculated power reduction threshold (T_LEV_USF), mainly due to the unknown effect of the interference. The network is consequently unable to properly correct the entity of the power reduction in order to avoid that the USF flag be too frequently unlistened by an addressed mobile station. An unlistened USF wastes overall transmission time because the mobile addressee of the unlisten USF loses the opportunity of transmitting the next RLC block and in the meanwhile transmissions are prevented to the other mobiles. Furthermore, communication between the network and the mobile station is governed by a handshake mechanism by which the network sending USF waits for data/control information back from the mobile since the next block period, or after a fixed time (RRBP). Whether an RLC block is not returned in due time the network decides either to re-assign USF to the same MS or assign it to another MS, depending on the scheduling algorithm. Too many re-assignment denote unreliability of the uplink connection and the impossibility to comply with transmission delay or other quality targets, so the connection shall be sooner released. These drawbacks become particularly serious in those environments characterized by strong cochannel interferers such as the small urban cells.

Purposes of the Invention

The main purpose of the present invention is that to overcome the drawbacks of the prior art and indicate a power control method for properly transmitting downlink time slotted information on the air-interface of packet switching cellular networks performing dynamic allocation of the RF channel among several users scheduled to access it.

SUMMARY AND ADVANTAGES OF THE INVENTION

To achieve said purposes the subject of the present invention is a power control method, as disclosed in the claim 1.

From the wording of the claim it can be appreciated that the power control method of the invention in subject takes effective precautions against the uncertainty on the RF channel conditions, due to the unknown effect of the interference. The feedback countermeasures adopted by the method of the invention dynamically correct the transmissible power, in order to minimize unsuccessful in the USF decoding. A mobile station without downlink TBF is served at best from a BTS operating in conformity with the disclosed method and can reaches greater data-rates on the uplink connection. The risk of the uplink TBF release is minimized consequently.

BRIEF DESCRIPTION OF THE DRAWINGS

Further objects and advantages of the present invention will be made clear by the following detailed description of an embodiment thereof and the annexed drawings given for purely non-limiting explanatory purposes and wherein.

DETAILED DESCRIPTION OF AN EMBODIMENT OF THE INVENTION

FIGS. 1, 2, 3a, 3b and 4 have already been duly discussed above.

Figure 1:
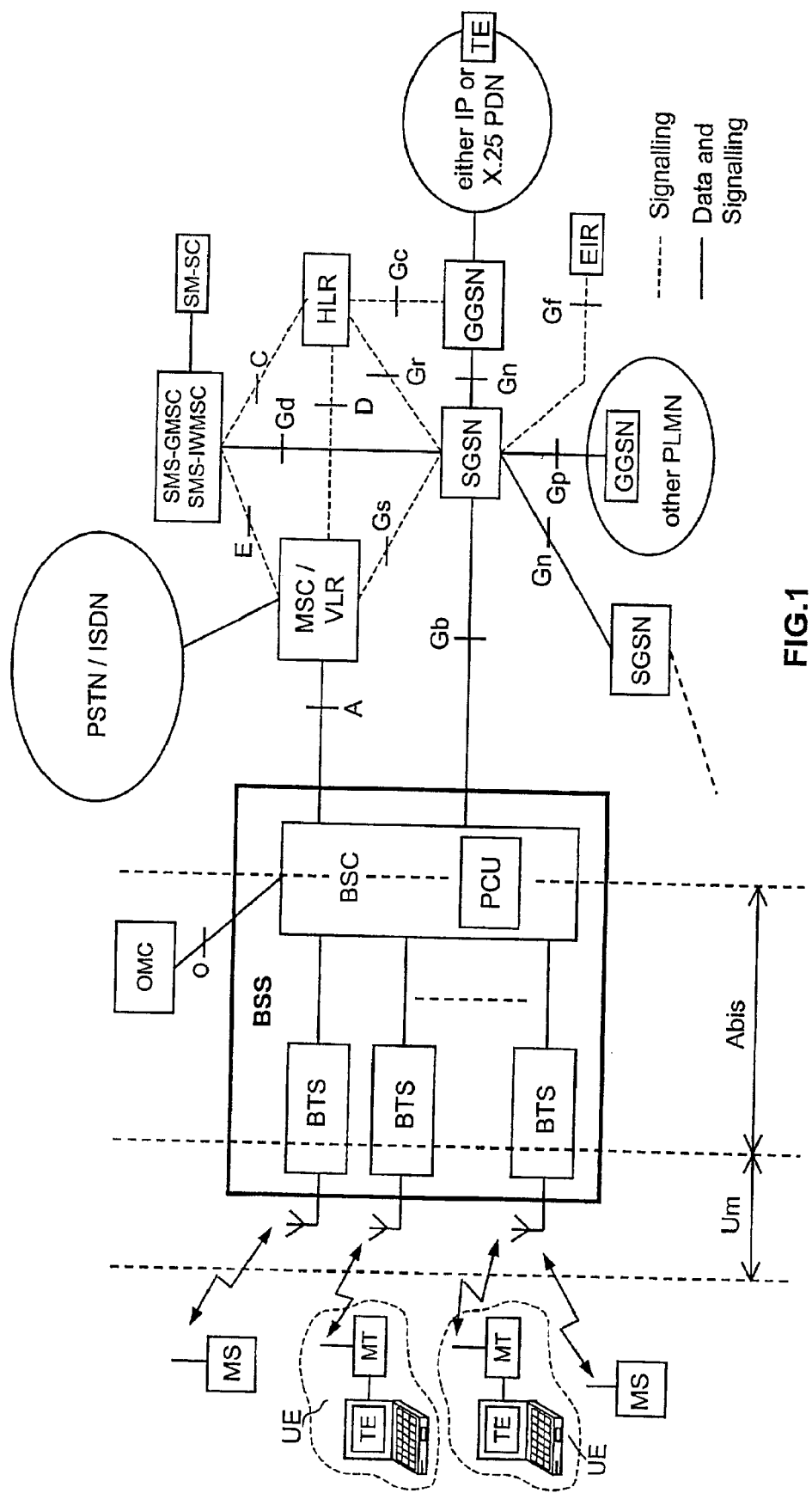
FIG. 1 shows an GSM and GPRS radiomobile network operating in conformity with the method of the present invention.
Figure 2:
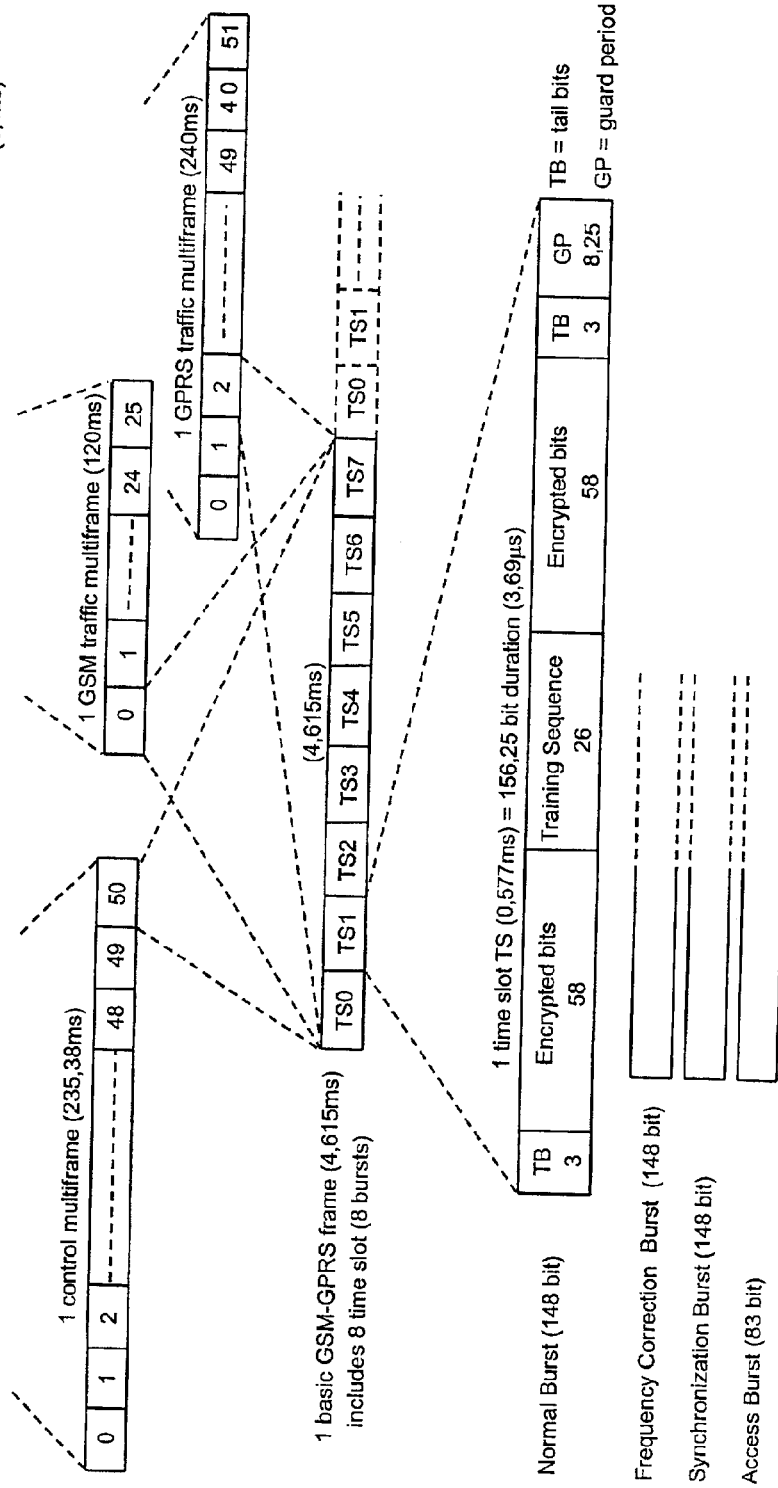
FIG. 2 shows a Time Division Multiple Access (TDMA) multiframe structure common to the GSM and GPRS of FIG. 1.
Figure 3A:
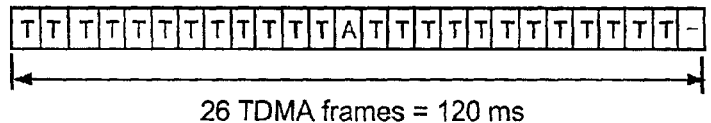
FIG. 3a shows a GSM traffic channel multiframe.
Figure 3B:
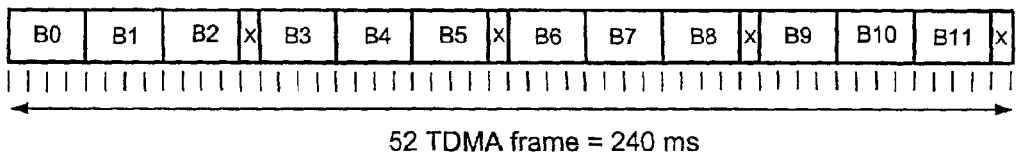
FIG. 3b shows an GPRS traffic channel multiframe.
Figure 4:
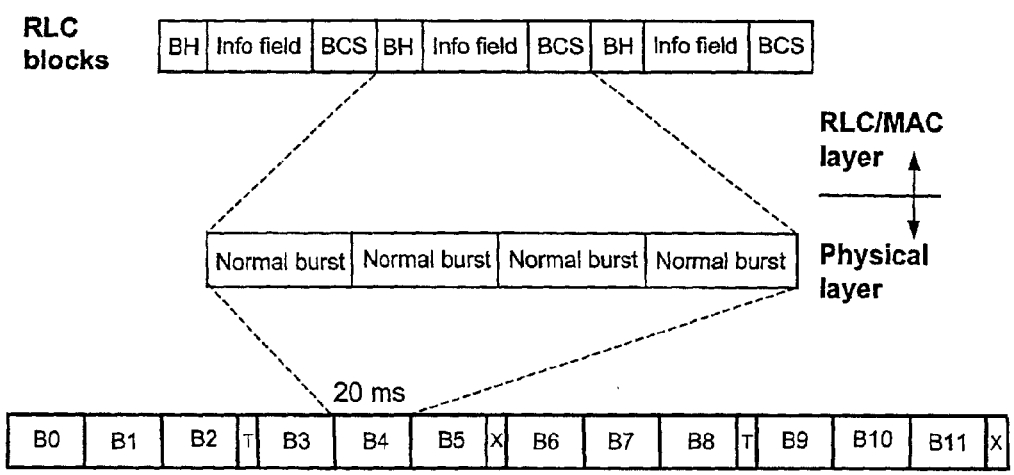
FIG. 4 shows the mapping of higher level frames into radio blocks belonging to the EGPRS multiframe of FIG. 3b.
Figure 5:
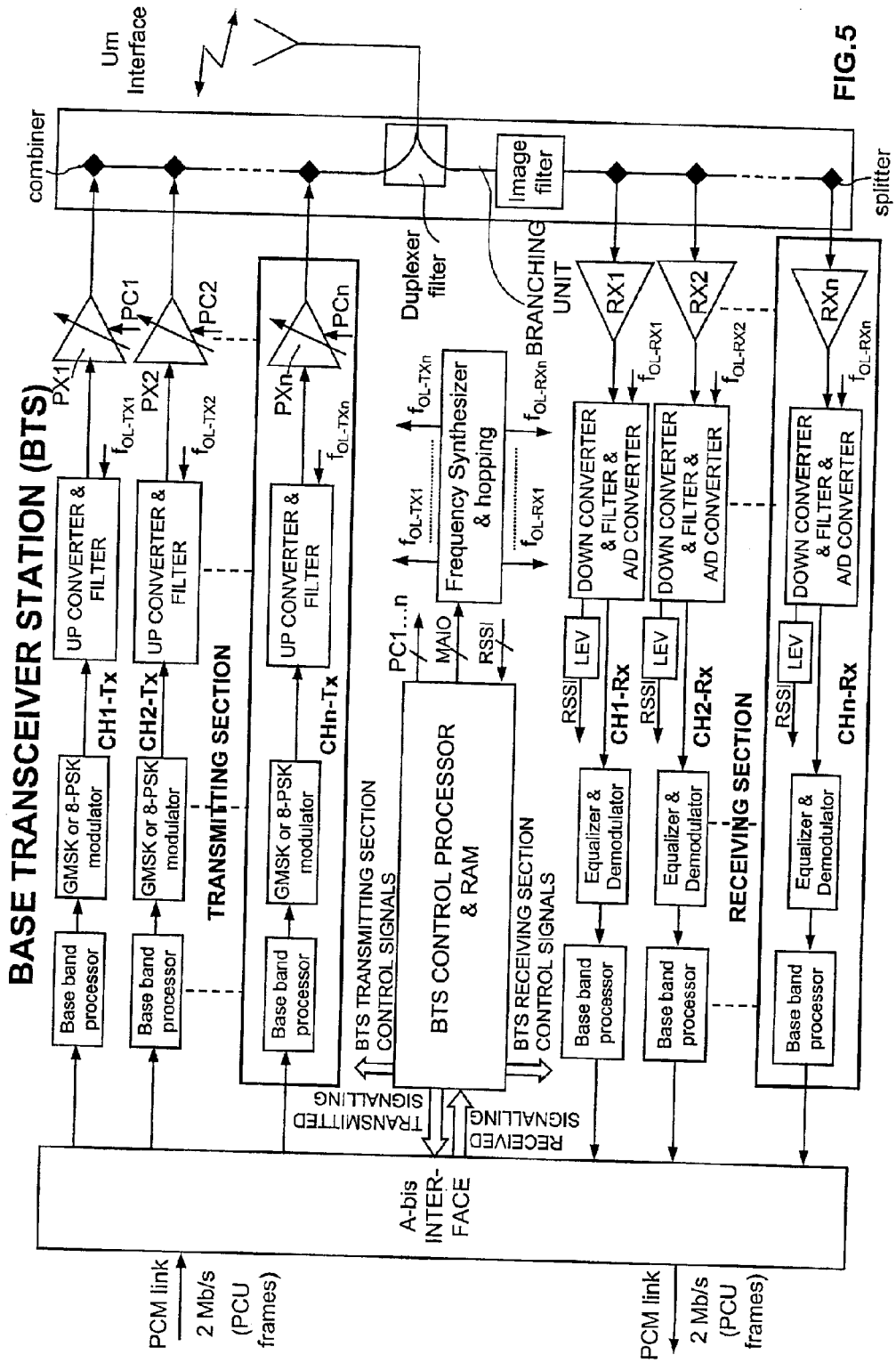
FIG. 5 shows the functional blocks of a base station BTS of FIG. 1 operating in conformity with the method of the present invention.

FIG. 5 shows a block diagram of a Base Transceiver Station (BTS) which takes part in the present invention by performing a more reliable transmission of the USF flag. The BTS station of FIG. 5 includes a TRANSMITTING SECTION and a RECEIVING SECTION both controlled through a BTS CONTROL PROCESSOR & RAM block, which further controls a Frequency Synthesizer & Hopping unit common to the two sections. The two Sections and the BTS CONTROL PROCESSOR & RAM block are connected to an A-Bis INTERFACE functional block for receiving/outputting one or more 2 Mb/s PCM link carrying PCU frames incoming from, or outgoing to, the BSC block (FIG. 1). A BRANCHING UNIT placed between the antenna and the two BTS sections includes a Duplexer filter which conveys to the antenna the global RF output signal of the TRANSMITTING SECTION, and to the input of the RECEIVING SECTION the wide band RF signal received on the antenna. The BRANCHING UNIT also includes n combiners, n splitters and an Image filter. For the sake of simplicity a "clock generator/extractor" and a "TDMA timing generator" are not shown in FIG. 5. The TRANSMITTING SECTION includes as many transmitters CH1-Tx . . . CHn-Tx as the n channels charged to the BTS. Each transmitter CHi-Tx includes the following functional blocks: Base band processor, GMSK or 8-PSK modulator, UP CONVERTER & FILTER, and RF power transmitter PXi. The RECEIVING SECTION includes an Image filter and as many receivers CH1-Rx . . . CHn-Rx as the n channels charged to the BTS. Each receiver CHi-Rx includes the following functional blocks: front-end receiver RXi, DOWN CONVERTER & FILTER & AND CONVERTER, LEV, Equalizer & Demodulator, e Base band processor. The n combiners inside the BRANCHING UNIT are connected in cascade and each to the output of a respective transmitting power amplifier PXi, the last combiner is connected to the transmitting port of the Duplexer filter crossed by the multicarrier cumulative signal. Similarly the receiving port of the Duplexer filter is connected to the Image filter and then to a cascade of splitters each connected to the input of a respective front-end amplifier RXi.

Staring from the Transmitting Section, the A-bis INTERFACE block extracts from the PCM link, or PCU frames, all the n elementary digital fluxes concerning CH1 . . . CHn channels relevant to the n users. The CH1 . . . CHn fluxes reach the inputs of respective CH1-Tx . . . CHn-Tx channel amplifiers. The singular flux CHi at the input of each channel amplifier reaches the included Base band processor to undergo all the digital treatments as: coding (parity, convolutional, fire), interleaving, ciphering, burst formatting, and differential coding. Convolutional coding provides a relevant EGPRS coding scheme dynamically changed, together with modulation, according to a link adaptation strategy disclosed in the European patent application EP 01830283.6, titled: METHOD TO PERFORM LINK ADAPTATION IN ENHANCED CELLULAR COMMUNICATION SYSTEMS WITH SEVERAL MODULATION AND CODING SCHEMES.

The coded signal outputted from the Base band processor reach the GMSK/8-PSK modulator to be modulated in respect of the MCS scheme selected by the same downlink adaptation strategy. The modulated signal reach the UP CONVERTER & FILTER block which receives a respective local oscillator signal $f_{OL-TXi}$ for translating the base band channel to a hopping position inside the wide Radio Frequency band. Frequency conversion is carried out in two stages: base band to Intermediate frequency (IF), and IF to radiofrequency (RF); each conversion stage is followed by a channel filtering stage. The hopping unit provides all the needed local oscillator signals $f_{OL-TX1} \ldots f_{OL-TXn}$. The up converted signal reaches the input of an RF power amplifier PX having variable gain adjustable by means of a command PCi, whose output signal is coupled to the relative splitter of the BRANCHING UNIT to be forwarded to the antenna and irradiated towards the mobile stations.

The RF wide band signal crossing the Image filter reaches the input of the n channel receivers CH1-Rx . . . CHn-Rx to be wide band amplified and down converted from RF to base band BB. The hopping unit provides all the needed local oscillator signals $f_{OL-RX1} \ldots f_{OL-RXn}$. As far as concerns the singular channel receivers CHi-Rx a respective local oscillator signal $f_{OL-RXi}$ reaches the DOWN CONVERTER & FILTER block for frequency conversion. Frequency conversion is carried out in two stages: radiofrequency (RF) to Intermediate frequency (IF), and IF to base band; each conversion stage is followed by a filtering stage in the channel band. The down converted signal is sampled and analog to digital converted. The digital signal is equalized and detected and the BTS is able to estimate the radial distance of the Mobile station from the measured delay of the maximum correlation instant of the training sequence. The demodulated signal is sent to the Base band processor to undergoes: Burst disassembling, Deciphering, De-interleaving, and Channel decoding in duality with the MS transmitter. Demodulation and Channel decoding are carried out either in a traditional way or with respect to the mentioned patent pending uplink adaptation method. Finally the properly decoded data relevant to CH1, . . . CHn traffic channels are delivered to the A-bis INTERFACE functional block to be assembled into the PCU frames conveyed on the outgoing 2 M/bit PCM link. The Base band processor of each CH1-Rx . . . CHn-Rx channel receiver has a channel decoder which detects and counts errored bits before error correction. The estimated Bit Error Rate (BER) value relative to a channel CHi correspond to the uplink measure UL_RXQUALi. Similarly, each CH1-Rx . . . CHn-Rx channel receiver has an its own circuit LEV which measures the strength RSSI of the received signal on a channel CHi during the active timeslots, and noise plus interference during idle timeslots. RSSI values relative to the channel CHi correspond to the uplink measure UL_RXLEVi.

The BTS CONTROL PROCESSOR & RAM block acts as an intermediary between the A-bis INTERFACE and the remaining blocks of the BTS. For this aim it communicates with the A-bis INTERFACE through two groups of signals indicated as RECEIVED SIGNALLING and TRANSMITTED SIGNALLING, and to the remaining blocks of the BTS through other two groups of signals indicated as BTS TRANSMITTING SECTION CONTROL SIGNALS and BTS RECEIVING SECTION CONTROL SIGNALS, respectively directed to the two sections. RECEIVED SIGNALLING signals indicate control message contents forwarded through PCU control frames directly to the BTS CONTROL PROCESSOR for the correct interpretation and execution of the embedded commands. Relevant commands for the present invention are those for individual step-by-step Power Control of all the PXi transmitting power amplifiers. From the control signals n Power Control commands PC1 . . . PCn directed to the PX1 . . . PXn amplifiers have been separately pointed out. Commands PC1 . . . PCn are determined at the BSC side following the method of the invention. Other typical commands directed to the two sections of the BTS are those for frequency hopping, represented by a plurality of indexes MAIO, and those for changing the current MCS schemes. TRANSMITTED SIGNALLING signals collect the power ($UL\_RXLEV_{1 \ldots N}$) and quality ($UL\_RXQUAL_{1 \ldots N}$) uplink measures performed by the BTS. These signals, in case a downlink TBF exist for the mobile stations, are put together with equivalent signals ($DL\_RXLEV_{1 \ldots N}$ and $DL\_RXQUAL_{1 \ldots N}$) coming from the downlink measures performed by the served mobile stations and both transmitted in uplink; the whole measures constituting the content of respective RLC control blocks conveyed on the PACCH control channel towards the BSC block.

BSC controller block (FIG. 1) manages both uplink and downlink Power Control procedure for GPRS/EGPRS. As far as concerns downlink Power Control, the BSC controller avails of quality measurement reports performed by mobile stations having downlink TBF. Downlink Power Control for dynamic allocation in conformity with the method of the present invention is used to send a downlink RLC data/control to a first mobile station and in the meanwhile the USF flag towards a second mobile station without a downlink TBF on which performing quality measures. Information about the existence of downlink/uplink TBFs and the scheduled order of data/control blocks using TFI/USF flags mechanism are taken from the PCU unit of the BSC which performs dynamic allocation. From above, the BSC controller shall preliminarily determine on which type of Measurement Report provided from the mobile stations via BTS it has to consider for calculating the right power reduction command to sent to the BTS for its execution; this task will be discussed with reference to the FIGS. 8 and 9.

Figure 6:
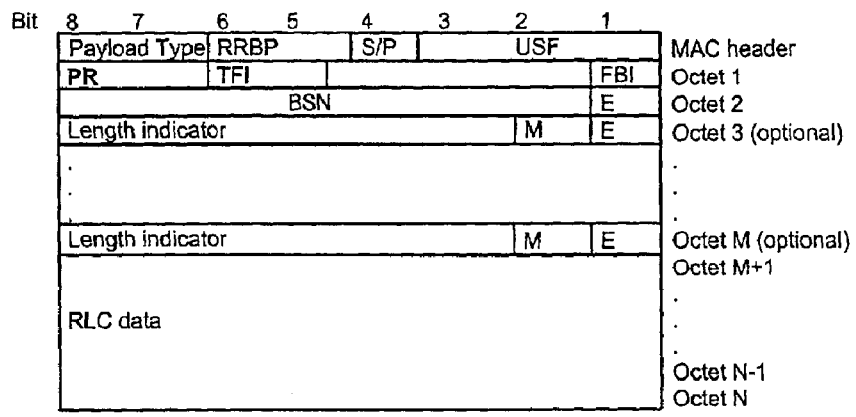
FIG. 6 shows a GPRS RLC data block with MAC header.
Figure 7:
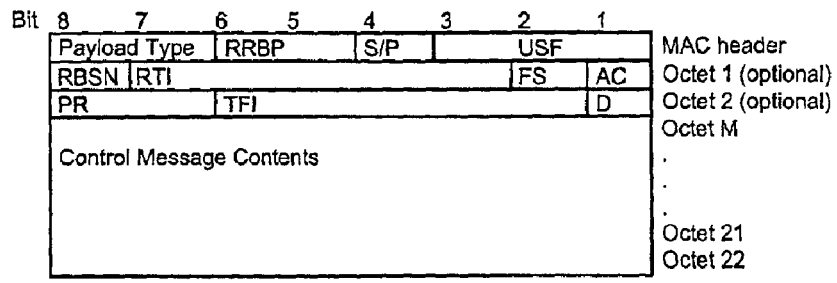
FIG. 7 shows a GPRS RLC control block with MAC header.

Before detailing the method of the invention some generalized arguments about downlink Power Control need to be considered. Signalling pertaining to Power Control is carried by relevant header fields together with specific control message parameters of the RLC data/control blocks crossing two-way the A-bis and the Um interfaces. FIG. 6 shows a RLC data block with MAC header. FIG. 7 shows a RLC control block with MAC header. The various fields of the header of the two blocks are defined according to GSM 04.60, while the remaining octets include RLC data and Control Message Contents, respectively.

Downlink power control can only be used when the serving BCCH and the used PDCH frequencies are in the same frequency band because of the output power which is needed on PDCH depends on the path-loss measured at the BCCH frequency. For dual-band systems, such as GSM900 and DCS1800, the frequency dependent path-loss might differ considerably. The BTS shall use constant output power level on the PDCH channel that contain Packet Broadcast Control Channel (PBCCH) or Packet Common Control Channel (PCCCH), the power level may be lower than the output power used on BCCH. The power reduction used on PCCCH, relative to the output power use on BCCH, is broadcast on PBCCH. On Packet Timing advance Control Channel Downlink (PTCCH/DL), the BTS shall use the same output power as for PBCCH, or BCCH, if PBCCH does not exist. On other PDCH radio blocks, downlink power control may be used. This shall be switched on/off on cell basis. The BTS shall use the same power on all four bursts within a radio block except for bursts transmitted on the BCCH carrier.

Two methods of downlink Power Control (PC) exist: Power Control mode A and Power Control mode B. PC mode A can be used for any allocation method (dynamic, fixed, extended dynamic). PC mode B can be used only for fixed allocation, in that is not particularly concerned in the description of the invention. The method used is determined by the BTS_PWR_CTRL_MODE bit as sent by the network to the MS in the Packet_up/downlink_assignment or the Packet_Timeslot_Reconfigure messages (see GSM 04.60).

In both PC modes, parameter P0 is used: it is defined as a fixed power reduction relative to BCCH used to set the transmission power on the downlink PDCH(s), and is also included in the two above messages. The value of P0 can not change during Packet Transfer Mode except in the case a reassignment or a new assignment is established not including any of the previously allocated PDCH(s). The value of P0 should be chosen on cell basis and so it is the same for every downlink TBF, values of P0 close to the value of Pb are recommended. If the O&M flag for DL power control is set, then P0 shall be present in above mentioned messages. P0 is coded with 4 bits:

| bit 4321 | |
|---|---|
| 0000 | P0 = 0 dB |
| 0001 | P0 = 2 dB |
| 0010 | P0 = 4 dB |
| . | . |
| . | . |
| . | . |
| 1111 | P0 = 30 dB |

In the method of the invention the Power Control mode A is used and the BTS shall limit its output power on blocks addressed to a particular MS within the range from $Level_H$ to $Level_L$, where:

$Level_H$=BCCH level−P0 dB and $Level_L$=BCCH level−P0 dB−10 dB. Hence in PC mode A the maximum range for DL power control is 10 dB. For synchronization purpose, the network shall ensure that each MS with an active TBF in uplink or downlink receives at least one block every 360 millisecond interval (78 TDMA frames) transmitted with an output power which is consistent with the downlink power control mode used.

On each PDTCHID block, the 2-bit PR field of the MAC header (FIGS. 6, 7) shall indicate the output power level used to send this block. In PC mode A of the present invention, the PR field of a block is calculated based on the BTS output power level in the direction of the addressed (RLC information) MS. The network shall not be allowed to change between PR modes during a TBF. The network shall only allocate to an MS one PR_MODE at a time.

The following 2-bits configuration of the PR field indicates the Power Reduction used at the BTS to send the RLC data blocks of FIG. 6 and, under certain restrictions, the control blocks of FIG. 7:

| bit 87 | Power Reduction |
|---|---|
| 00 | 0–2 dB less than BCCH level-P0 |
| 01 | 4–6 dB less than BCCH level-P0 |
| 10 | 8–10 dB less than BCCH level-P0 |
| 11 | Not usable. |

The 2-bits PR field in the RLC block header shown in the FIGS. 6 and 7 cannot describe the real power reduction of the block as it is transmitted by the BTS, because the 2-bits resolution is not sufficient to specify all 2 dB steps within the 10 dB dynamic range exactly.

Figure 8:
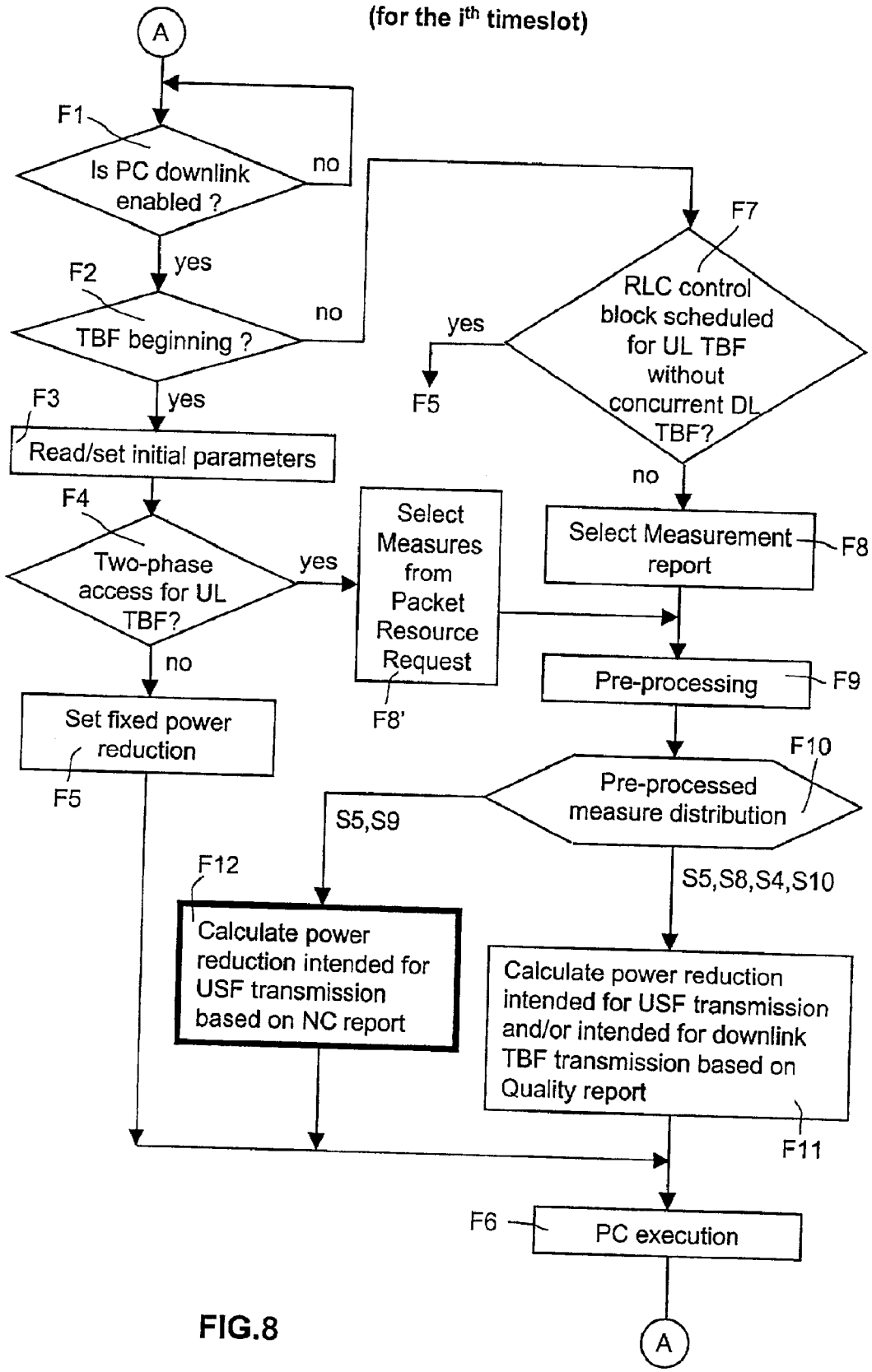
FIG. 8 shows a high level flow-chart of the power control method of the present invention.
Figure 9:
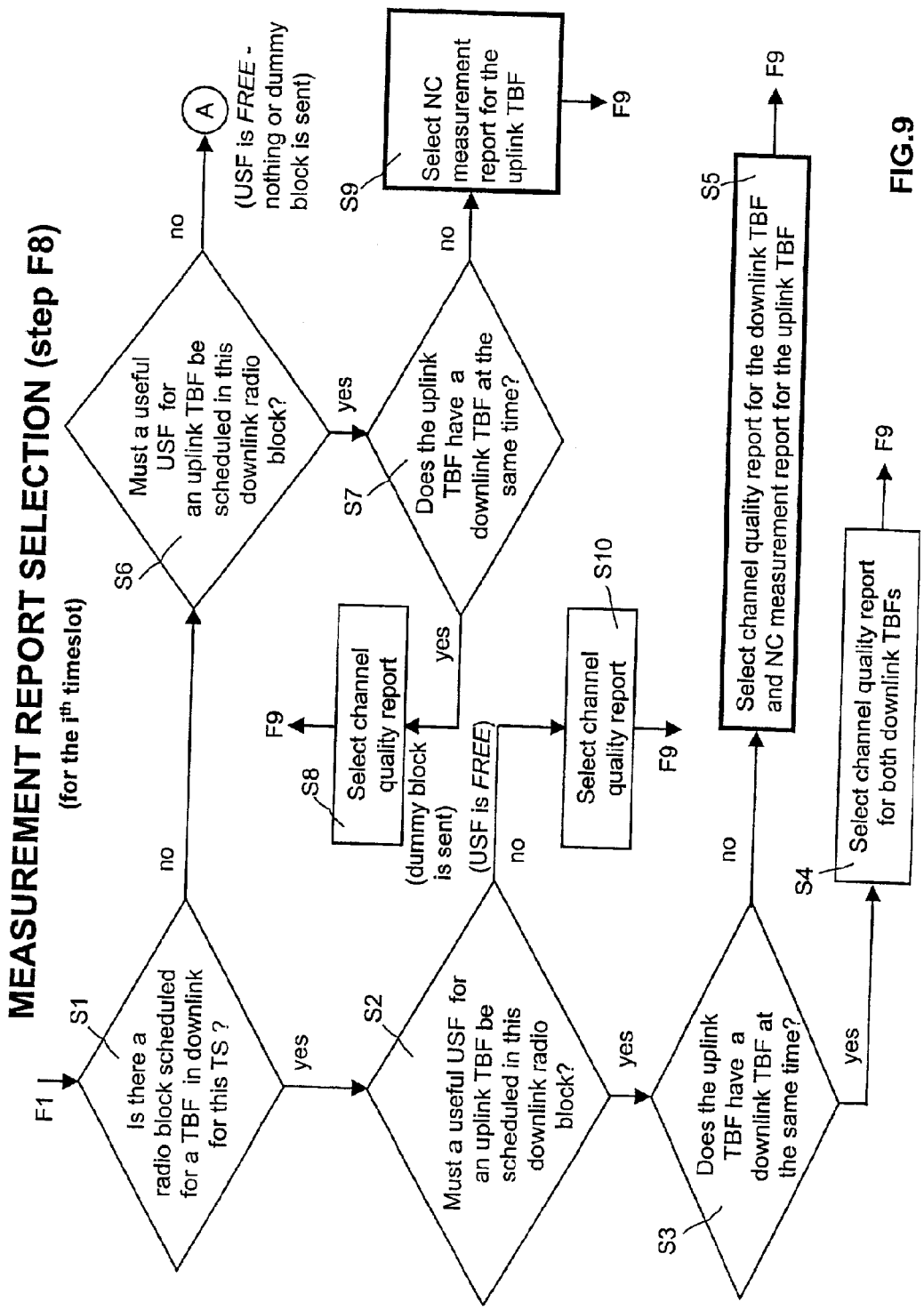
FIG. 9 shows a flow-chart which details a Measurement Report selection step F8 of the high level flow-chart of the preceding FIG. 8.

FIG. 8 shows a high level diagram of the downlink Power Control procedure which is the subject of the present invention. The procedure of FIG. 8 is valid for both data and control RLC/MAC blocks of the preceding FIGS. 6 and 7. The depicted diagram is referred to the i-th timeslot of a carrier currently in use in the serving cell, but it is obviously extended to all GPRS timeslots of the same carrier and to all the carriers used in the serving cell, on condition that multislot assignment allocation be duly considered. The power control procedure is mostly charged to a microprocessor included in the BSC block (FIG. 1) controlled through a program which carries out the method of the present invention depicted in respective flow-charts constituting suitable descriptions. Initial step F1 is a waiting cycle for a start condition of the procedure. PC is entered when both a downlink TBF has been assigned to an MS in transfer mode and Power Control downlink is enabled on that TBF. The successive step F2 is a query for a TBF beginning valid for downlink and uplink TBFs. In case TBF beginning is true some relevant initial parameters are read, or set, in step F3 that will be detailed later on. In the successive step F4 another query is performed to detect a condition regarding the beginning of an uplink TBF whose mobile has requested two-phases access for transfer data. If also the condition of step F4 is false a fixed power reduction is set in the successive step F5, and a Power Control execution command is issued in step F6. Then the program is re-executed from the initial step F1. If in the preceding step F1 the condition on TBF beginning is false the power reduction should avail of measurement reports, but before selecting a Measurement report in step F8 a further query concerning RLC control block is risen in step F7. Affirmative answer in step F7 sends back to fixed power reduction of step F5. Negative answer in step F7 enables the selection of suitable Measurement report, or reports, in step F8. Measurement Report includes measurements made by MSs and sent to the network. FIG. 9, that will be discussed immediately in the following, is entirely devoted to illustrate the selection step F8. A different way to supply measures in uplink is that indicated by step F8', which incomes when the query step F4 is answered yes. In such a case measures are provided with a single block Packet Resource Request message, sent from a Mobile for a two-phase access, whose content can include measures of interference on all the timeslots (with reference to GSM 4.60; 11.2.0).

Figure 10:
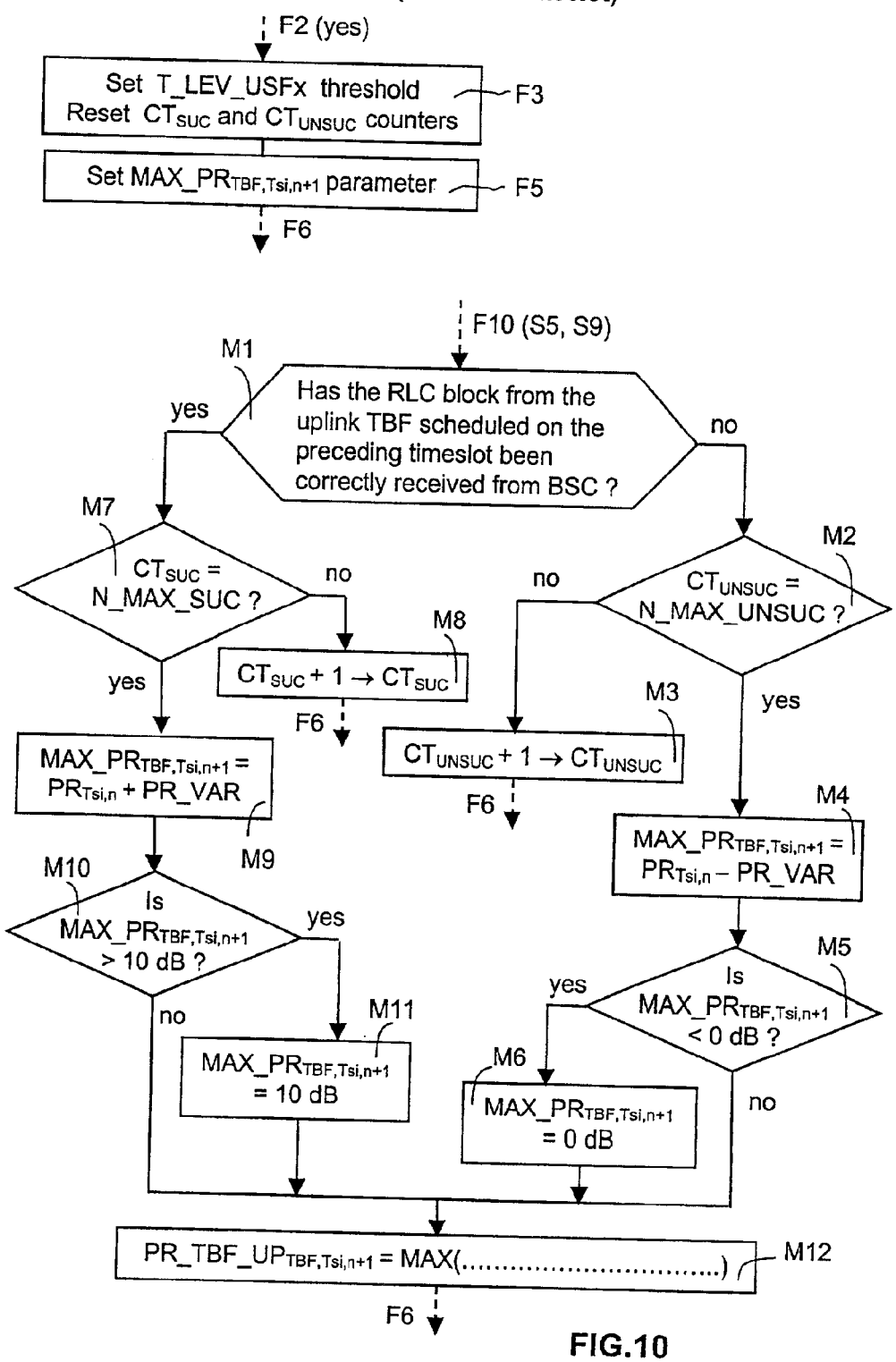
FIG. 10 shows a flow-chart which details a power reduction calculation step F12 mostly representative of the present invention and belonging to the high level flow-chart of the preceding FIG. 8.

Once the measurement report has been selected in F8, or in case provided by F8', the reported measures are pre-processed in step F9, by averaging each measured parameter in a respective running average filter. In the successive step F10 the pre-processed measurements are selectively forwarded towards two different calculation steps, namely F11 and F12, for the definition of the BTS Power Reduction within the range 0, . . . , 10 dB. Step F11 performs calculation when both addressed MSs have a DL TBF in progress. Step F12 performs calculation when the MS for which the USF is intended has not a downlink TBF. Different report measurements are available for the two cases, but a unique power reduction must be calculated in order to make the BTS output power sufficient for the MS for which the RLC block is intended as well as the MS for which the USF is intended. The selection criterion adopted in step F10 is the coincidence with final steps S4, S5, S8, S9, and S10 that will be defined with reference to the FIG. 9. It's useful to anticipate that step S9, and partially step S5, select measurements performed by the mobile on direct Network Control, while the remaining steps avails of the most common Quality Report. Step S5 (FIG. 9) represents the hybrid case in which the two type of reports are both produced from two reporting mobiles. While step F11 is known, step F12 substantially performs, in combination, the teaching of the present invention. Both steps F11 and F12 will be well detailed in the following, for the only step F12 a separate FIG. 10 is devoted.

Once the power reduction has been calculated, the execution command is issued in step F6; then the program returns to the initial point A. Because of the power reduction is calculated for the two involved TBFs, namely the downlink TBF (Data Receiving) and uplink TBF (USF Receiving), the lower power reduction is used to create the power control command for the transmitter which shall send the RLC Radio Block. The power control command is sent to the BTS, via the A-bis interface.

Now the relevant steps of the downlink Power Control method of FIG. 8 are detailed beginning from the step F3 incoming at the beginning of an uplink/downlink TBF. In this step useful initial parameters are read/set, like O&M parameters valid on the whole cell, or parameters valid for single TBF, or for single radio block. Relevant parameters are:

enabling/disabling flag of the downlink power control on the considered PDCH;

the already defined fixed power reduction P0, set by O&M between a range of 0, . . . , 30 dB;

mode A/B flag for the selection of downlink power control mode (only mode A for dynamic allocation of the present invention);

Reporting period coinciding with the polling period set up and adjusted by O&M. Reporting period spans a number of transmitted RLC blocks after which the network asks for PACKET DONWLINK ACK/NACK. Consequently it depends on the load of the cell because of dynamical multiplexing of several TBFs on the same PDTCH;

parameters that will be defined with reference to the calculation step F11 and F12.

The fixed power reduction step F5, when referred to the beginning of a downlink TBF, is set to zero. Consequently RLC radio blocks are always sent with the maximum available power PBCCH–P0 until the first measurement report is received. The same applies for the beginning of an uplink TBF on the branch answered "no" in step F4. Lastly the same applies for an RLC control block scheduled for uplink TBF without concurrent downlink TBF answered "yes" in step F7.

FIG. 9 indicates the detail of the Measurement Report Selection step F8 of the preceding FIG. 8. The detail is a selection procedure involving new steps S1 to S10 starting at each new RLC block period. The selection criteria are derived from the PCU scheduler on the basis of existent TBFs for the two (or the one) mobile stations involved at each timeslot. Step S1 follows answered "no" branch of step F2 of the main program, it seeks for a radio block scheduled for transmission during the actual timeslot on the existent downlink TBF. In absence of a scheduled radio block for the downlink TBF a dummy burst shall be transmitted in order to convey USF. Starting from step S1, each branch of the flow-chart leads to a respective final step in which the relevant measurement report is selected. In particular:

for the MS with a TBF in downlink, i.e. that MS for which the RLC block is intended, as in steps S4, S8, and S10, it will be used Channel Quality measurement Report sent on PACCH channel in PACKET DOWNLINK ACK/NACK message.

For MS, for which the USF is intended, as in steps S3 and S6, there exist 2 possibilities:
1) it will be used again the Channel Quality measurement Report, if this MS has also in the meantime a TBF in downlink direction, as in the steps S4 and S8, otherwise,
2) It will be used the Packet Measurement Report message sent by MS periodically to the network upon the reception of parameter NETWORK_CONTROL_ORDER (NC1 or NC2) included in a Packet_Measurement_Order message sent from the network to that particular PACCH channel. This is the case of steps S5 and S9 which select a measurement report relevant for the present invention.

If a dummy block is sent in step S1 and the condition of step S7 is met, the channel quality measurement report is selected in step S8. Finally if a USF is not scheduled for the present radio block, its value has been set to FREE by the PCU and the quality report is either considered or not depending on the presence of a scheduled radio block. In the second case the selection procedure returns to the initial condition A at the beginning of step F1 (FIG. 8).

As far as concerns the GPRS Channel Quality Report selected in the outlined steps S5, S8, S4, and S10, the MS is in Packet Transfer state and it has a downlink TBF. The MS shall transfer to the network Channel Quality Report within the PACKET DOWNLINK ACK/NACK sent on PACCH. In the following (with reference to GSM 4.60; 11.2.0) the structure of the Channel Quality Report is shown:

<C_VALUE: bit (6)>
<RXQUAL: bit (3)>
<SIGN_VAR: bit(6)>
<I_LEVEL_TN0: bit (4)>
<I_LEVEL_TN1: bit (4)>
<I_LEVEL_TN2: bit (4)>
<I_LEVEL_TN3: bit (4)>
<I_LEVEL_TN4: bit (4)>
<I_LEVEL_TN5: bit (4)>
<I_LEVEL_TN6: bit (4)>
<I_LEVEL_TN7: bit (4)>;
where:
C_VALUE is the level of BCCH carrier of the serving cell measured by MS.
RXQUAL is the quality parameter BER measured downlink.
SIGN_VAR is variance of the C_VALUE (see GSM 05.08). SIGN_VAR is not used in the present invention.

I_LEVEL_TNi, i=0, . . . , MAX_TS=7: interference signal level of all GSM timeslots on the same carrier as the assigned PDCHs derived from $\gamma_{CH,TSi}$ i=0, . . . , 7. The MS shall make these measurements during the search frames (indicated with X in the multiframe of FIG. 3b) and PTCCH frames, which are not required for BSIC decoding or the timing advance procedure. The resolution of each value is 4 bits and the 16 values for I_LEVEL_TNi: I_LEVEL_0_TNi, . . . , I_LEVEL_15_TNi specify the interference level per timeslot i relative to C_VALUE ranging from C to C −28 dB or even less (see GSM 04.60, GSM 05.08, section 10.3). This will allow BSC to make a quality based adjustment for all DL radio blocks, where the involved MS have a DL TBF in progress.

As far as concerns Packet_Measurement_Report (GSM 04.60), reported from MS to the network, the report is generally used for network control reselection but can be used also for different purpose, in particular the downlink power control of the present invention. This message can carry Network Controlled or also Extended measurements. The former measurements are only made in packet transfer mode and are indicated by the parameter NETWORK_CONTROL_ORDER, when this is set to NC1 or NC2 (as defined in GSM 05.08, 10.1.4). In the following the structure of the Network Controlled Measurement Report message is shown:

<NC_MODE: bit (1)>
<RXLEV_SERVING_CELL: bit (6)>
<INTERFERENCE_SERVING_CELL: bit (6)
<NUMBER_OF_NC_MEASUREMENTS: bit (3)>
<FREQUENCY_N: bit (6)>
<BSIC_N: bit (6)>
<RXLEV_N: bit (6)>.

The useful parameter for PC purpose contained in NC Measurement Report is RXLEV_SERVING_CELL, that is, the level of the BCCH carrier of the serving cell as measured by the MS. NC measurement reports do not give any hints about the interference situation on the PDTCH because INTERFERENCE_SERVING_CELL only includes a mean value. Hence, especially for "USF-MS" without DL TBF, Power Control is restricted on pure signal level and cannot be based on quality estimates. Parameters like NC_REPORTING_PERIOD(s) and NC1, NC2 are broadcast on PBCCH (PSI 5 Message). The parameters may also be sent individually to an MS through Packet_Measurement_Order or Packet_Cell_Change_Order Messages on PCCCH or PACCH channel, in which case it overrides the broadcast parameters. The MS in packet transfer mode reads, in step F3, the parameter NC_REPORTING_PERIOD_T which specifies one of the following values expressed in seconds: 0.48, 0.96, 1.92, 3.84, 7.68, 15.36, 30.72, 61.44. The four initial values are default ones.

Now the pre-processing step F9 is discussed. In this step measures reported in the one or the two types of measurement reports are averaged in respective running average filters. More precisely, Channel Quality Report selected in one of the preceding steps S4,S5,S8, or S10 is used for averaging the measures of C_VALUE and I_LEVEL_TNi, i=0, . . . , 7 for each downlink TBF and uplink TBF having concurrent downlink TBF. While NC Measurement Report selected in the preceding step S5 or S9 is used for averaging the measures of RXLEV for uplink TBF without concurrent downlink TBF. The averaging intends for filtering the measurements such that fast fluctuations in the observed variables due to fading effects do not cause control decisions and also to ensure is not too slow.

For each downlink TBF and uplink TBF measurements used in the Power Control process shall be averaged in a running average filter.

Mean values $C_{AVG\_ServingCell}$, $I\_LEVEL\_TN_{AVG\_i}$ i=0, . . . , 7 at the reporting instant j for a given downlink connection is obtained from the Channel Quality report by:

$$C_{AVG\_ServingCell}(j)=(1-\lambda)*C_{AVG\_ServingCell}(j-1)+\lambda*C\_VALUE(j); \qquad \text{Eq. 1}$$

with $C_{AVG\_ServingCell}(0)=-120$ dBm, and $$I\_LEVEL\_TN_{AVG\_i}(j)=(1-\lambda)*I\_LEVEL\_TN_{AVG\_i}(j-1)+\lambda*I\_LEVEL\_TN_i(j); \qquad \text{Eq. 2}$$

with $I\_LEVEL\_TN_{AVG\_i}(0)=0$ dBm; i=0, . . . , 7; where:

$$\lambda=1/\text{MIN}(j,N_{AVG}/\text{POLLING\_PERIOD\_DW}); \qquad \text{Eq. 3}$$

$N_{AVG}$=filtering period (input parameter) in terms of number of RLC blocks;

$N_{AVG} \geq$ POLLING_PERIOD_DW. The value of $\lambda$ is variable, i.e. at the beginning of the filtering (when the first uplink measurement report is come) its value is 1 and then it decreases step by step to the $1/(N_{AVG}/\text{POLLING\_PERIOD\_DW})$ value. So the initial values of $C_{AVG\_ServingCell}(0)$ and $I\_LEVEL\_TN_{AVG,i}(0)$ shall not be a problem.

As long as no report is received the BSS should set the values of $C_{AVG\_ServingCell}$ to a very small level, e.g. noise floor (e.g. −120 dBm) and the values of $I\_LEVEL\_TN_{AVG\_i}$ to a very high level (e.g 0 dBm) in order to have no Power Reduction due to the formula that will be disclosed illustrating step F11.

Mean value $RXLEV_{AVG\_ServingCell}$ at the reporting instant j for a given uplink TBF without parallel DL TBF, (for some "USF-MS" only) is obtained from the NC measurement reports by:

$$R_{AVG\_ServingCell}(j)=(1-\delta)*R_{AVG\_ServingCell}(j-1)+\delta*RXLEV\_SERVING\_CELL(j); \qquad \text{Eq. 4}$$

with $R_{AVG\_ServingCell}(0)=-120$ dBm; where:

$$\delta=1/\text{MIN}(j,T_{AVG}/\text{NC\_REPORTING\_PERIOD\_T}). \qquad \text{Eq. 5}$$

NC_REPORTING_PERIOD_T=Reporting period for network control cell reselection in Transfer Mode.

$T_{AVG}$=filtering period (input parameter) in seconds.

$T_{AVG}$>=NC_REPORTING_PERIOD_T

The value of $\delta$ is variable, i.e. at the begin of the filtering (when the first uplink measurement report is come) its value is 1 and then it decreases step by step to the $1/(T_{AVG}/\text{NC\_REPORTING\_PERIOD\_T})$ value. So the initial values of $R_{AVG\_ServingCell}(0)$ shall not be a problem.

As long as no report is received the BSS should set the values of $R_{AVG\_ServingCell}$ to a very small level, e.g. noise floor (e.g. −120 dBm) in order to have no Power Reduction due to the formula that will be disclosed illustrating step F12.

The next distribution step F10 forwards the averaged measures to the two calculation steps F11 and F12 maintaining the same criteria adopted in the pre-processing step F9, to say, averaged measures originated from the channel quality report are forwarded to the calculation step F11, while the averaged measures originated from the NC measurement report are forwarded to the calculation step F12.

Step F11 is discussed at first. The averaged measures forwarded to this calculation step enable it to decide the best power reduction for a TBF in order to perform a Power Control based on the comparison between a measured quality parameter C/I and a (C/I)TARGET fixed for that TBF. The criterion followed to set the $C/I_{TARGET}$ is disclosed in the above mentioned EP 01830283.6 application and clarified at the end of the description of the step F11. In that, for every timeslot assigned to a downlink TBF, the output power necessary in the $n+1^{th}$ period for $TS_i$ with $i=0 \ldots 7$ to get the target value of the $C/I_{TARGET}$ for the connection shall be:

$$P_{TSi,n+1} = P_{BCCH} - C_{AVG\_ServingCell,n} + I\_LEVEL\_TN_{AVG\_i,n} + \left(\frac{C}{I}\right)_{TARGET} \quad \text{Eq. 6}$$

with i 0, ..., 7; where:

- $P_{BCCH}$ stands for the output power of BCCH of the serving cell.
- $C_{AVG\_ServingCell,n}$ is the value of the signal level of the serving cell, measured by MS, averaged by the running average filter.
- $P_{BCCH}-C_{AVG\_ServingCell,n}$ is the calculated path loss. The path loss is approximately the same for every PDCH in the same band.
- $I\_LEVEL\_TN_{AVG}$ is the value of the interference power of the i-th timeslot, measured by MS, averaged by the running average filter.

In the following a numerical example is shown:
If $P_{BCCH}=40$ dBm; $C_{AVG\_ServingCell,n}=-80$ dBm; $I\_LEVEL\_TS_{AVG\_TS}=-80$ dBm $-12$ dB; $(C/I)_{TARGET}=12$ dB, then $P_{TS}=40$ dBm$-(-80$ dBm$)+(-80$ dBm$-12$ dB$)+(12$ dB$)=40$ dB.

The BTS shall limit its output power on blocks addressed to a particular MS to levels between (BCCH level–P0 dB) and (BCCH level–P0–10 dB).

In step F11 $PR\_TBF\_DW_{TSi,n+1}$ defines the power reduction on the i-th timeslot for the MS for which the block RLC is intended and it is calculated by:

$$PR\_TBF\_DW_{TSi,n+1}=\text{MAX}(0, \text{MIN}(10, P_{BCCH}-P0-P_{TSi,n+1})) \quad \text{Eq. 7}$$

with i=0, ..., 7.
In the following it is shown some numerical examples:
If $P_{BCCH}=40$ dBm; P0=0 dB; $(C/I)_{TARGET}=12$ dB; then PR_TBF_DW=MAX(0, MIN(10, 40 dBm–0 dB–40 dB))=0.
If $(C/I)_{TARGET}=10$ dB then PR_TBF_DW=2 dB (DL RF power will be reduced).
If $(C/I)_{TARGET}=14$ dB then PR_TBF_DW=0 dB (no impact, DL RF power too small but system outside the control range).

In step F11 $PR\_TBF\_UP_{TSi,n+1}$ defines the power reduction on the i-th timeslot for the MS for which the USF is intended, if this MS has also a TBF in downlink in the same time, the power reduction is calculated by:

$$PR\_TBF\_UP_{TSi,n+1}=\text{MAX}(0,\text{MIN}(10,P_{BCCH}-P0-P_{TSi,n+1}+\text{delta}CSx)) \quad \text{Eq. 8}$$

with i=0, ..., 7 and x=1, ..., 4 for GPRS (CS1, ..., CS4), where delta_CS is the difference between C/I for data and C/I for the USF, because the USF is much more protected than pure data bits.

Figure 11:
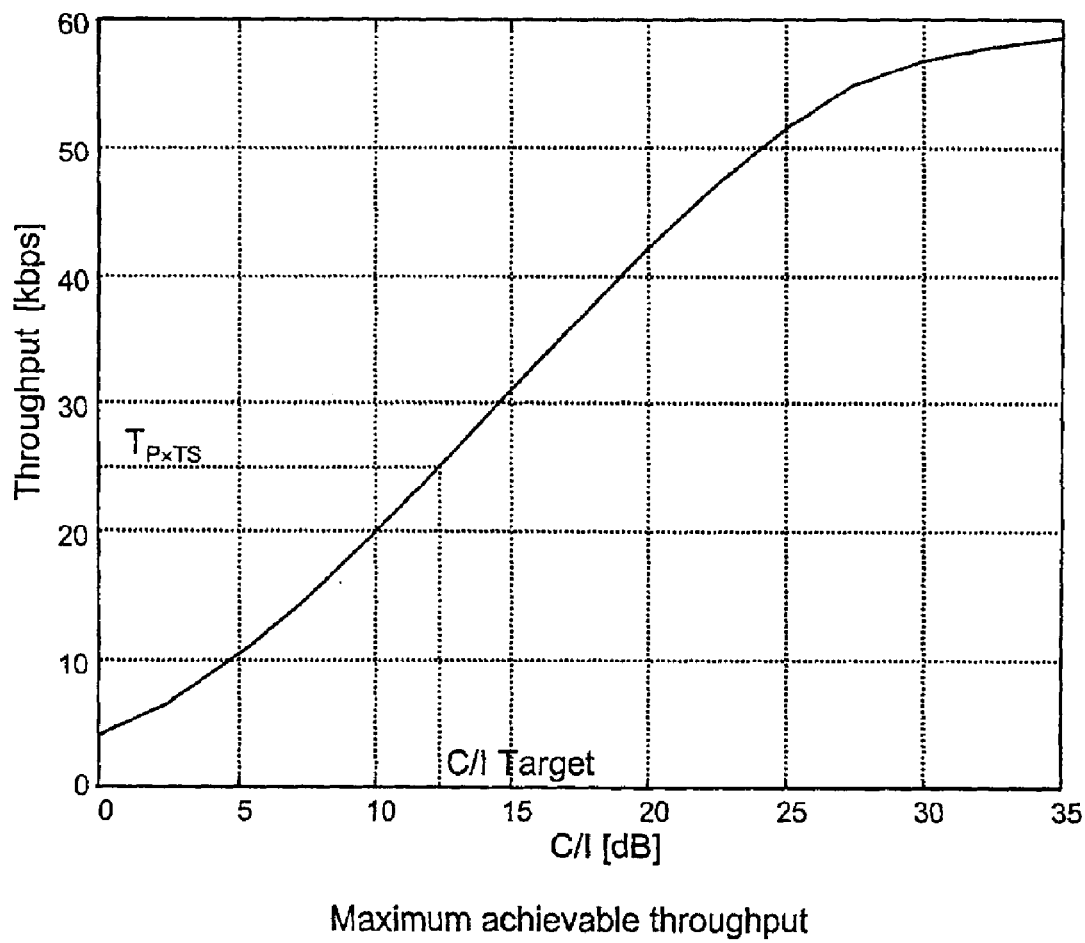
FIG. 11 shows a curve which links C/I to the maximum achievable throughput per timeslot, usable to set a (C/I)$_{TARGET}$ to be introduced into a power reduction calculation step F1 which belongs to the high level flow-chart of the preceding FIG. 8.

For every TBFs in step F11, independently from the Coding Scheme, a $(C/I)_{TARGET}$ is derived from Peak Throughput ($T_P$) QoS class requested by the MS. The Peak Throughput per TS ($T_{PxTS}$) can be calculated as:

$$T_{PxTS}=T_P/N_{TS} \quad \text{Eq. 9}$$

where $N_{TS}$ is the number of timeslots allocated to the TBF, i.e. $N_{TS}$ is the minimum number between the number allocable timeslots and the number of timeslots that can be handle by the MS due to its multislot class. Once $T_{PxTS}$ is determined, the appropriate C/I can be selected. The $(C/I)_{TARGET}$ value corresponding to $T_{PxTS}$ is derived by the curve of FIG. 11 which links C/I to the maximum achievable throughput per TS. In case the preceding step S5 and S9 (FIG. 9) where absent, the execution step F6 performs Power Control considering the only calculation step F11, otherwise step F12 shall be considered.

Step F12 is performed when the MS for which the USF is intended has not a concurrent downlink TBF. The power reduction in such a case will be only based on the signal level because information on the quality is not reported in the reporting message. A threshold T_LEV_USFx with x=CS1, ..., CS4 (GPRS) used for coding USF is defined on cell basis for the signal level measured on the PDTCH (Packet Data Traffic Channel), so that when the average of level measurements is equal to the threshold a fixed probability there is that the USF is decoded with success. In order to set a fixed probability it's useful to underline that for CS-2, CS-3 and CS-4 the USF decoding is performed by soft correlation with the eight possible 12-bit code-words. For CS-1, USF error is detected after normal decoding of the convolutional code. This means that the performance for the USF is equal for CS-2, CS-3 and CS-4 while for CS-1 a slightly worse performance is achieved, but it is still significantly better than the corresponding Block Error Rate (BLER). The introduction of EGPRS service may introduces additional T_LEV_USF thresholds more tied to the singular Modulation and Coding Scheme (MCS). Useful T_LEV_USF thresholds valid on cell basis are calculated off-line, separately for each Coding Scheme CS, a table is assigned to the BTS with the calculated thresholds and the indication which Coding Schemes they are respectively associated to, in order to be read by BSC in step F3.

Because of the interference level is not known, the only adjusting of the USF level by T_LEV_USF thresholds might bring up some problems: for example, if the DL power level is too small and the MS cannot decode USF, no UL radio block will be sent consequently. The downlink power control method of the present invention, mainly charged to the calculation step F12 in combination with the off-line setting of the T_LEV_USF thresholds, overcomes this drawback by providing a new variable $\text{MAX\_PR}_{TBF,Tsi}$ at the disposal of the BSC for dynamically increasing or decreasing the necessary USF power level within the maximum control range of 10 dB, for the MS with uplink TBF only. As indicated in the next FIG. 10 the BSC has to count successfully and unsuccessfully blocks received uplink upon the scheduled USFs; the lack of a scheduled block shall be noticed by the network.

With reference to the FIG. 10 it can be noticed that steps F3 and F5 (FIG. 8) are re-proposed in the upper part of the Figure for the only aim of indicating the relevant initial setting. More precisely in step F3 the threshold T_LEV_USFx relevant to the CSx used for transmitting the USF is set, and two counters respectively named $CT_{SUC}$ and $CT_{UNSUC}$ are reset. In step F5 the variable $\text{MAX\_PR}_{TBF,Tsi}$ representing a maximum unconstraint power reduction is set to its maximum value of 10 dB at the start of the uplink TBF; with this position the effective power reduction calculated in step F12 of FIG. 8 (step M12 of the FIG. 10) is zeroed and USF is initially transmitted with the maximum permissible power.

The allowed maximum power reduction calculated in step M12 for the scheduled uplink TBF shall be:

$$PR\_TBF\_UP_{TSi,n+1}=\text{MAX}(0,\text{MIN}(\text{MAX}\_PR_{TBF,TSi,n+1}, R_{AVG\_PDTCH}-T\_LEV\_USFx)) \quad \text{Eq. 10}$$

with i=0, . . . , 7; x=1, . . . , 4 for GPRS, where:

$$R_{AVG\_PDTCH}=R_{AVG\_ServingCell}-P0 \quad \text{Eq. 11}$$

and $R_{AVG\_ServingCell}$ is the averaged value of the measured level RXLEV_SERVING_CELL calculated in the pre-processing step F9 (FIG. 8) for that TBF. The power reduction decided in the initial step F5 or the subsequent step M12 contribute to the PC execution step F6 (FIG. 8). The right answer to the query step M1 relevant to the scheduled uplink TBF is given by the network: which checks the reception of the radio block from the mobile scheduled for the uplink TBF in the i-th timeslot. If in step M2 this block is not, or badly, received uplink for N_MAX_UNSUC consecutive times (e.g. 2) then the variable $\text{MAX}\_PR_{TBF,TSi}$ is updated in step M4 according to:

$$\text{MAX}\_PR_{TBF,TSi,n+1}=PR_{TSi,n}-PR\_VAR \quad \text{Eq. 12}$$

where $PR_{TSi,n}$ is the power reduction used on the i-th timeslot of that TBF at n-th step of the PC procedure and PR_VAR (e.g. 2 dB) is used to reduce $PR_{TSi,n}$ (increasing the transmitted power).

If in step M5 the value $\text{MAX}\_PR_{TBF,Tsi,n+1}$ is smaller than 0 dB it shall be set to 0 dB in the successive step M6 to stay within a reasonable numerical range.

If in step M7 the radio block scheduled for the uplink TBF in the i-th timeslot is correctly received for N_MAX_SUC consecutive times (e.g. 10), then in step M9 the variable $\text{MAX}\_PR_{TBF,Tsi,n+1}$ is updated according to:

$$\text{MAX}\_PR_{TBF,Tsi,n+1}=\text{MAX}\_PR_{TBF,Tsi,n}+PR\_VAR \quad \text{Eq. 13}$$

where PR_VAR is used to increase the maximum power reduction allowed for that uplink TBF on the i-th timeslot (reducing the transmitted power). In step M10 a check is performed if the variable $\text{MAX}\_PR_{TBF,Tsi,n+1}$ is more than 10 dB. In case of affirmative answer in step M10 in the successive step M11 the variable $\text{MAX}\_PR_{TBF,Tsi}$ is limited to its maximum value of 10 dB. The allowed maximum power reduction $PR\_TBF\_UP_{TSi,n+1}$ is calculated in step M12.

This process can be accelerated, if in the beginning of the uplink TBF the network, to say BSC and PCU, uses half N_MAX_SUC value in step M7 for power reduction and after stabilization the whole number N_MAX_SUC. The switch between N_MAX_SUC and N_MAX_SUC/2 can be controlled via the Block Sequence Number (BSN) of the TBF or via the Ack/Nack-Period.

In the following a numerical example is shown:
If T_LEV_USFx=−95 dBm; $\text{MAX}\_PR_{TBF,TS}$=8 dB; $R_{AVG\_PDTCH}$=−90 dBm Then $PR\_TBF\_UP_{TSi}$=MAX(0, MIN(e.g.8 dB, −90 dBm −(−95 dBm)))=5 dB.

Now the Power Control execution step F6 is detailed. Calculations that will be indicated in this step for the i-th timeslot regarding an RLC radio block, are equally performed for every involved timeslot and for every RLC radio block. Before sending the execution command a unique value of power reduction is set as in the following:

$$PR_{TSi,n+1}=\text{MIN}(PR\_TBF\_UP_{TSi,n+1}, PR\_TBF\_DW_{TSi,n+1}) \quad \text{Eq. 14}$$

with i=0, . . . , 7,
this is the power reduction corresponding to the PR field of the MAC header of the downlink RLC block shown in the FIGS. 6 and 7.

With reference to the FIG. 9 the following special cases must be guaranteed:
DL radio block does not address any USF-mobile (unused USF or USF=free), this is the case of a negative answer in steps S2 and S6. In this case a second mobile intended for USF is not involved and the power reduction PR_TBF_UP is set at its maximum value of 10 dB directly in step F11.

DL radio block has only a USF-mobile and no DL informative content, this is the case of a positive answer in step S7. In this case a second mobile intended for the RLC radio block is not involved and the power reduction PR_TBF_DW is set at its maximum value of 10 dB directly in step F11.

In case of Extended dynamic allocation (GSM 4.60; 8.1.1.2) an USF_GRANULARITY of 4 can be considered, in that four UL radio blocks in series are assigned to the same USF-mobile, although only the first DL block has a valid USF value. Hence PR_TBF_UP can be set to 10 dB for the 3 last blocks of the 4 blocks, PR_TBF_DW, however, changes normally from block to block in case of TBF multiplex. This is specified in GSM 05.02: "if the USF in block B(x−1) indicates that block B(x) shall be used by an MS for which the USF_GRANULARITY is set to 1 (corresponding to 4 blocks) in the last assignment message, that MS shall also use the three following blocks. The USF corresponding to the last three blocks shall be set to an unused value". The Extended dynamic allocation is not represented in the figures, for the sake of brevity.

Four bits are available in PCU Frames for downlink power control of radio blocks. The range of power control is from 0 dB to 30 dB with 16 steps per 2 dB. The next power reduction discrete range shall be:

$$PRC_{TSi,n+1}=P0+PR_{TSi,n+1}-(P0+PR_{TSi,n+1})\text{mod } 2 \quad \text{Eq. 15}$$

with i=0, . . . , 7.

What is claimed is:
1. Power control method of the RF signal transmitted from a Base Station transmitter of a cellular packet switching network on a downlink channel time-slotted on a downlink carrier towards a first mobile station scheduled among the ones sharing the downlink channel for receiving either a data or control packet from a Temporary Buffered connection named TBF assigned to it for downlink; the RF signal being further addressed to a second mobile station whether it correctly decodes an Uplink State Flag, named USF, included in the header of said downlink packet for scheduling a TBF assigned to the second mobile station for transmitting either a data or control packet towards an uplink shared channel time-slotted on an uplink carrier; the first mobile station sending to the network, at reporting period, measures of signal level performed on the modulated carrier of the serving cell conveying a broadcast control channel transmitted with its maximum power and measures of interference level on the downlink channel, while the second mobile station, in case having an uplink TBF without a concurrent downlink TBF, sending to the network the only level measures performed on said carrier under network control; all the said measures being averaged and then compared with target values in order to decide a stepped increment or decrement of the transmitted power on said downlink channel, comprising the following steps to cope with the first mobile station having a downlink TBF and the second mobile station having an uplink TBF without a concurrent downlink TBF:

determining an off-line threshold (T_LEV_USFx) for the signal level measurable on said downlink channel, depending on the coding scheme used for the USF flag, so that when the mean value of the level measures is equal to the threshold a fixed probability takes place that the USF flag is decoded with success;

checking if a packet transmitted by the scheduled uplink TBF has been correctly received from the network and increment a successfully counting ($CT_{SUC}$) in affirmative case or an unsuccessfully counting ($CT_{UNSUC}$) on the contrary case;

checking if one of the two counting reaches a respective fixed maximum counting first (N_MAX_SUC, N_MAX_UNSUC) and either decrementing the next transmissible power in case the maximum successfully counting is reached before, or incrementing the next transmissible power in case the maximum unsuccessfully counting is reached before;

deciding a first transmissible power intended for transmitting USF by taking the highest between the next transmissible power and the difference between the mean value of the level measures and said threshold (T_LEV_USFx);

deciding a second transmissible power intended for transmitting a packet downlink by the comparison of the averaged path loss plus interference on the downlink channel since the last power control command sent to said transmitter, with a target quality parameter C/I calculated thereupon;

deciding the unique transmissible power on said downlink channel by taking the maximum between said first and second transmissible power and set this unique power with the next Power Control command.

2. Power control method according to claim 1, characterized in that a fixed power reduction relative to the constant power modulated carrier of the serving cell is applied in the cell for transmitting on said downlink channel.

3. Power control method according to claim 2, characterized in that if said downlink packet is a control packet, said first transmissible power is fixed to the maximum permissible.

4. Power control method according to claim 1, characterized in that at the beginning of a TBF connection said second transmissible power is fixed to the maximum permissible.

5. Power control method according to claim 1, characterized in that if the second mobile has requested standard short access or one-phase access in order to transfer data packets on uplink, then at the beginning of the uplink TBF said first transmissible power is fixed to the maximum permissible.

6. Power control method according to claim 1, characterized in that said averaged values of the measures are obtained through as many running average filters operating on measure samples taken at a reporting interval set from the network.

7. Power control method according to claim 1, characterized in that said target quality parameter C/I is calculated by:

setting $T_{PxTS} T_p/N_{TS}$, being:
$T_{PxTS}$ the Peak Throughput per timeslot,
$T_P$ the Peak Throughput derived from a Quality of Service Class of the TBF downlink,
$N_{TS}$ the minimum between the number of allocable timeslots and the number of timeslots that can be handled by the MS due to its multislot class; and mapping the calculated $T_{PxTS}$ on the values of maximum achievable net throughout in function of C/I, obtaining said target value of C/I independently of the adopted coding scheme used for transmitting packets downlink.

8. Power control method according to claim 1, characterized in that in the beginning of said uplink TBF half value of said fixed maximum successfully counting is used for decrementing said next transmissible power and after the power stabilization the whole value is reinstated, in order to speed up the initial power control.

9. Power control method according to claim 1, characterized in that said averaged value of the level measures performed by said second mobile station is obtained by the following expression:

$$R_{AVG\_ServingCell}(j)=(1-\delta)*R_{AVG\_ServingCell}(j-1)+\delta* RXLEV\_SERVING\_CELL(j);$$

with $R_{AVG\_ServingCell}(0)$ set at the noise floor,
where:
j is the reporting measurement instant,
RXLEV_SERVING_CELL is the level measure,
$R_{AVG\_ServingCell}$ is the averaged value of the level measures,
$\delta=1/MIN(j,T_{AVG}/NC\_REPORTING\_PERIOD\_T)$, where:
NC_REPORTING_PERIOD_T is said reporting period, preferably coinciding with the reporting period for network control cell reselection in Transfer Mode,
$T_{AVG}$ is the filtering period $\leq$ the NC_REPORTING_PERIOD_T.

10. Power control method according to claim 1, characterized in that said averaged value of the level measures performed by said first mobile station is obtained by the following expression:

$$C_{AVG\_ServingCell}(j)=(1-\lambda)* C_{AVG\_ServingCell}(j-1)+\lambda*C\_VALUE(j);$$

with $C_{AVG\_ServingCell}(0)$ set at the noise floor,
where:
j is the reporting measurement instant,
C_VALUE is the level measure of the serving cell carrier,
$C_{AVG\_ServingCell}$ is the averaged value of the level measures,
$\lambda=1/MIN(j,N_{AVG}/POLLING\_PERIOD\_DW)$, where:
POLLING_PERIOD_DW spans a number of transmitted packets after which the network asks for PACKET DONWLINK ACK/NACK message,
NAVG $\geq$ POLLING_PERIOD_DW is the filtering period in terms of number of packets.

11. Power control method according to claim 1, characterized in that said averaged value of the interference measures performed by said first mobile station on all the available isofrequential channels is performed by:

$$I\_LEVEL\_TN_{AVG\_i}(j)=(1-\lambda)*I\_LEVEL\_TN_{AVG\_i}(j-1)+\lambda*I\_LEVEL\_Tn_i(j);$$

with $I\_LEVEL\_TN_{AVG\_i}(0)=0$ dBm, i=0, ..., MAX_TS
where:
j is the reporting measurement instant,
i is the actual timeslot.,
MAX_TS is the maximum permissible number of timeslots in the TDMA frame,
$I\_LEVEL\_TN_{AVG\_i}$ is the averaged value of the interference measures, λ=1/MIN(j,$N_{AVG}$/POLLING_PERIOD_DW), where:
$N_{AVG}$≧POLLING_PERIOD_DW is the filtering period in terms of number of packets.

12. Power control method according to claim 11, characterized in that for every timeslot i=0, . . . , MAX_TS assigned to a downlink TBF, said second transmissible power is calculated by:

$$P_{TSi,n+1} = P_{BCCH} - C_{AVG\_ServingCell,n} + I\_LEVEL\_TN_{AVG\_i,n} + \left(\frac{C}{I}\right)_{TARGET}$$

where:

n+1 is the next power control execution step, $P_{BCCH}$ stands for the output power of the serving cell carrier conveying the broadcast control channel, $C_{AVG\_ServingCell,n}$ is the value of the signal level of the serving cell, measured by MS, averaged by the running average filter, $P_{BCCH}-C_{AVG\_ServingCell,n}$ is the calculated path loss, I_LEVEL_$TN_{AVG}$ is the value of the interference power of the i-th timeslot, measured by MS, averaged by the running average filter.

13. Power control method according to claim 1, characterized in that said: next, first, and second transmissible power are expressed in terms of respective next, first, and second power reduction, (MAX_$PR_{TBF, TSi, n+1}$, PR_TBF_$UP_{TSi, n+1}$, PR_TBF_$DW_{TSi, n+1}$), spanning a fixed dB range and initialized at the beginning of an uplink or downlink TBF connection for obtaining the maximum permissible transmission power from the Base Station intended for USF or packet data transmission respectively.

14. Power control method according to claim 13, characterized in that said second power reduction (PR_TBF_$DW_{TSi, n+1}$) on the timeslot i is calculated by:

$$PR\_TBF\_DW_{TSi,n+1}=MAX(0,MIN(PWCR,P_{BCCH}-P0-P_{TSi,n+1}))$$

where:

n+1 is the next power control execution step,

P0 is said fixed power reduction,

PWCR is the top level of said fixed dB range.

* * * * *